United States Patent
Schoenbach et al.

(10) Patent No.: US 8,566,081 B2
(45) Date of Patent: Oct. 22, 2013

(54) METHOD AND SYSTEM PROVIDING INTERPRETING AND OTHER SERVICES FROM A REMOTE LOCATION

(76) Inventors: Stanley F. Schoenbach, Riverdale, NY (US); Eliane R. Uscher, Riverdale, NY (US)

( * ) Notice: Subject to any disclaimer, the term of this patent is extended or adjusted under 35 U.S.C. 154(b) by 1354 days.

(21) Appl. No.: 11/084,793

(22) Filed: Mar. 18, 2005

(65) Prior Publication Data
US 2005/0216252 A1 Sep. 29, 2005

Related U.S. Application Data (60) Provisional application No. 60/556,113, filed on Mar. 25, 2004.

(51) Int. Cl.
*G06F 17/20* (2006.01)
(52) U.S. Cl.
USPC ............................. 704/8; 704/1; 704/2
(58) Field of Classification Search
USPC ................. 704/2, 3, 277, 8; 348/211.12
See application file for complete search history.

(56) References Cited

U.S. PATENT DOCUMENTS

| | | | | |
|---|---|---|---|---|
| 5,295,068 A * | 3/1994 | Nishino et al. | | 704/10 |
| 5,659,764 A * | 8/1997 | Sakiyama et al. | | 704/3 |
| 5,751,957 A * | 5/1998 | Hiroya et al. | | 709/203 |
| 5,875,422 A * | 2/1999 | Eslambolchi et al. | | 704/3 |
| 5,987,401 A * | 11/1999 | Trudeau | | 704/2 |
| 6,690,932 B1 * | 2/2004 | Barnier et al. | | 455/414.1 |
| 6,901,361 B1 * | 5/2005 | Portilla | | 704/8 |
| 6,992,692 B2 * | 1/2006 | Gu et al. | | 348/14.12 |
| 7,023,979 B1 * | 4/2006 | Wu et al. | | 379/265.11 |
| 7,110,938 B1 * | 9/2006 | Cheng et al. | | 704/5 |
| 7,123,694 B1 * | 10/2006 | Hecker | | 379/88.05 |
| 7,139,807 B2 * | 11/2006 | Comstock et al. | | 709/207 |
| 7,620,169 B2 * | 11/2009 | Harkreader et al. | | 379/265.02 |
| 2002/0022954 A1* | 2/2002 | Shimohata et al. | | 704/3 |
| 2003/0103075 A1* | 6/2003 | Rosselot | | 345/717 |
| 2003/0125927 A1* | 7/2003 | Seme | | 704/3 |
| 2004/0001446 A1* | 1/2004 | Bhatia et al. | | 370/261 |
| 2004/0047342 A1* | 3/2004 | Gavish et al. | | 370/352 |
| 2004/0068411 A1* | 4/2004 | Scanlan | | 704/277 |
| 2004/0078256 A1* | 4/2004 | Glitho et al. | | 705/8 |
| 2004/0167768 A1* | 8/2004 | Travieso et al. | | 704/2 |
| 2004/0167770 A1* | 8/2004 | Zhuo et al. | | 704/4 |
| 2004/0174979 A1* | 9/2004 | Hutton et al. | | 379/265.02 |
| 2004/0179229 A1* | 9/2004 | Laughlin | | 358/1.15 |
| 2004/0210603 A1* | 10/2004 | Roston | | 707/104.1 |

(Continued)

OTHER PUBLICATIONS

Deaf-Talk How it Works http://web.archive.org/web/20030410015407/www.deaf-talk.com/how_it_works.html.*

*Primary Examiner* — Douglas Godbold (57) ABSTRACT

A method and system for providing interpreting services is disclosed. The system includes interpreting apparatus at several user sites where interpreting services are needed, such as hospitals or other health care facilities, and a central controller. A request is made from one of the user sites to the central controller and, in response, the central controller makes a link between the user site and an interpreting site. A live interpreter at the interpreting site provides interpretation through the link. The link may be used for audio, or audio and video signals.

18 Claims, 5 Drawing Sheets

(56) References Cited

U.S. PATENT DOCUMENTS

2004/0218744 A1* 11/2004 Nguyen et al. ........... 379/202.01
2005/0132340 A1*  6/2005 Houghton et al. ............ 717/136
2005/0213737 A1*  9/2005 Rodman et al. .......... 379/202.01
2005/0227768 A1* 10/2005 Blackburn et al. .............. 463/42
2006/0173724 A1*  8/2006 Trefler et al. ..................... 705/8
2007/0112553 A1*  5/2007 Jacobson ........................ 704/2

* cited by examiner

METHOD AND SYSTEM PROVIDING INTERPRETING AND OTHER SERVICES FROM A REMOTE LOCATION

RELATED APPLICATIONS

This application claims priority to provisional application Ser. No. 60/556,113 filed Mar. 25, 2004 and incorporated herein by reference.

The subject application is also related to application Ser. No. 10/729,590 filed Dec. 5, 2003, incorporated herein by reference.

BACKGROUND OF THE INVENTION

A. Field of Invention

This invention pertains to a method and system for providing interpreting services for various persons, including, for example, patients in a hospital, or other medical facility.

B. Description of the Prior Art

While the primary and official language in the United States is English, many people living here are fluent only in other languages. Frequently, these people have difficulty communicating in English at a time and place where exchanging information with others is crucial. For example, the inability to communicate is a serious problem for a patient in a hospital or other similar health care facility. Here, for obvious reasons, it is important that patients have the ability to communicate with a doctor or nurse.

In the past, this problem was addressed by providing a live interpreter at the facility. Of course, providing live interpreters is very expensive. Moreover, most facilities have limited space and, therefore, providing interpreters for more than two or three languages is just not practical, even for only a couple of hours a day.

One alternative system proposed by Deaf-Talk LLC of Pittsburgh, Pa., consisted of a two-way video conferencing system between the patient and the interpreter. However, the system must use a dedicated ISDN line, and therefore it is inflexible and not readily available. Therefore, the interpreting service can be provided only at sites that have an ISDN termination.

Hand-held and PC-based devices are available that use translation software to convert text from one language to another. However, in some instances, these devices are not suitable because they are difficult to use, they are inaccurate, they are able to process only written information, and they are very impersonal.

SUMMARY OF THE INVENTION

Briefly, the present invention pertains to a system and method of providing interpreting services to at least one user from a remote location through a central controller. The services are provided through teleconferencing equipment. The system includes a user site where interpreting services are needed and has an interpreting apparatus including user teleconferencing means and an Internet port with a fixed or dynamic IP address coupled to the teleconferencing means. The system further includes at least one interpreter site with Internet access means and interpreter teleconferencing means; and a central controller receiving a request for interpreting service from the user sites and establishing a teleconference conversation link between the interpreter site through said interpreter teleconferencing means and the Internet access port; and the respective user teleconferencing means to enable a conversation between said one user site and said interpreter site.

DETAILED DESCRIPTION OF THE INVENTION

Figure 1:
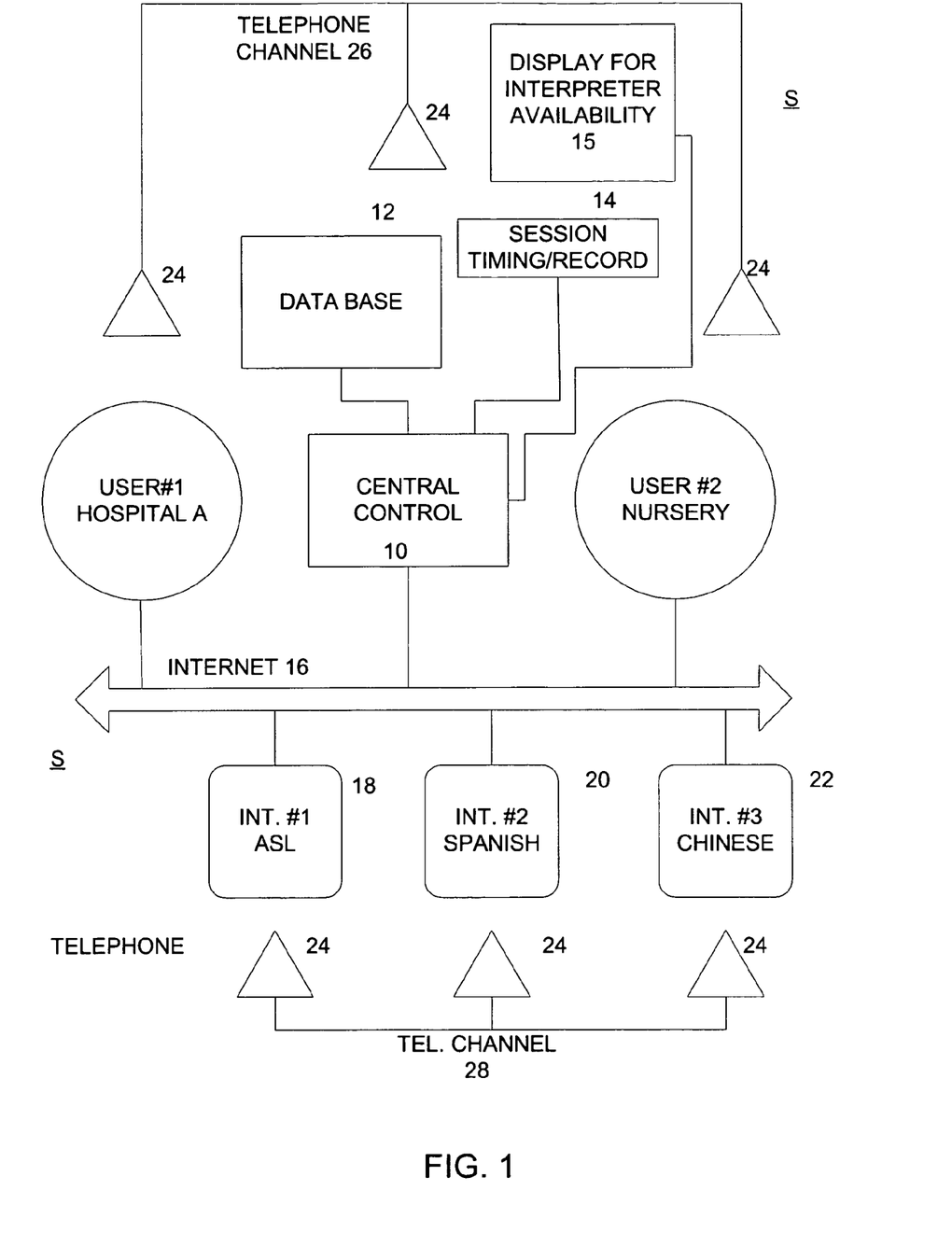
FIG. 1 shows a block diagram of a system constructed in accordance with this invention.

FIG. 1 shows the various components of a system S for providing interpreting services. In this system, user site #1 may be used by a patient and/or a health provider in a hospital, and user site #2 may be used by a patient and/or a health provider in the same hospital, or another facility, such as a nursing home. The system also includes a central control unit 10 which is associated with a data base 12 and a session timing or recorder unit 14. The actual services are provided by several interpreters. The interpreters may cover the same or different languages. For example, interpreter 18 may be proficient in American Sign Language (ASL), interpreter 20 may be proficient in Spanish, and interpreter 22 may be proficient in Chinese.

Digital communication (including voice and video signals) between the interpreters and the respective user sites are established through Internet connections.

In addition, standard telephones 24 are provided for each user site, interpreter, and personnel at the central control site to enable standard voice communication through land lines or wireless lines 26, 28.

Figure 2:
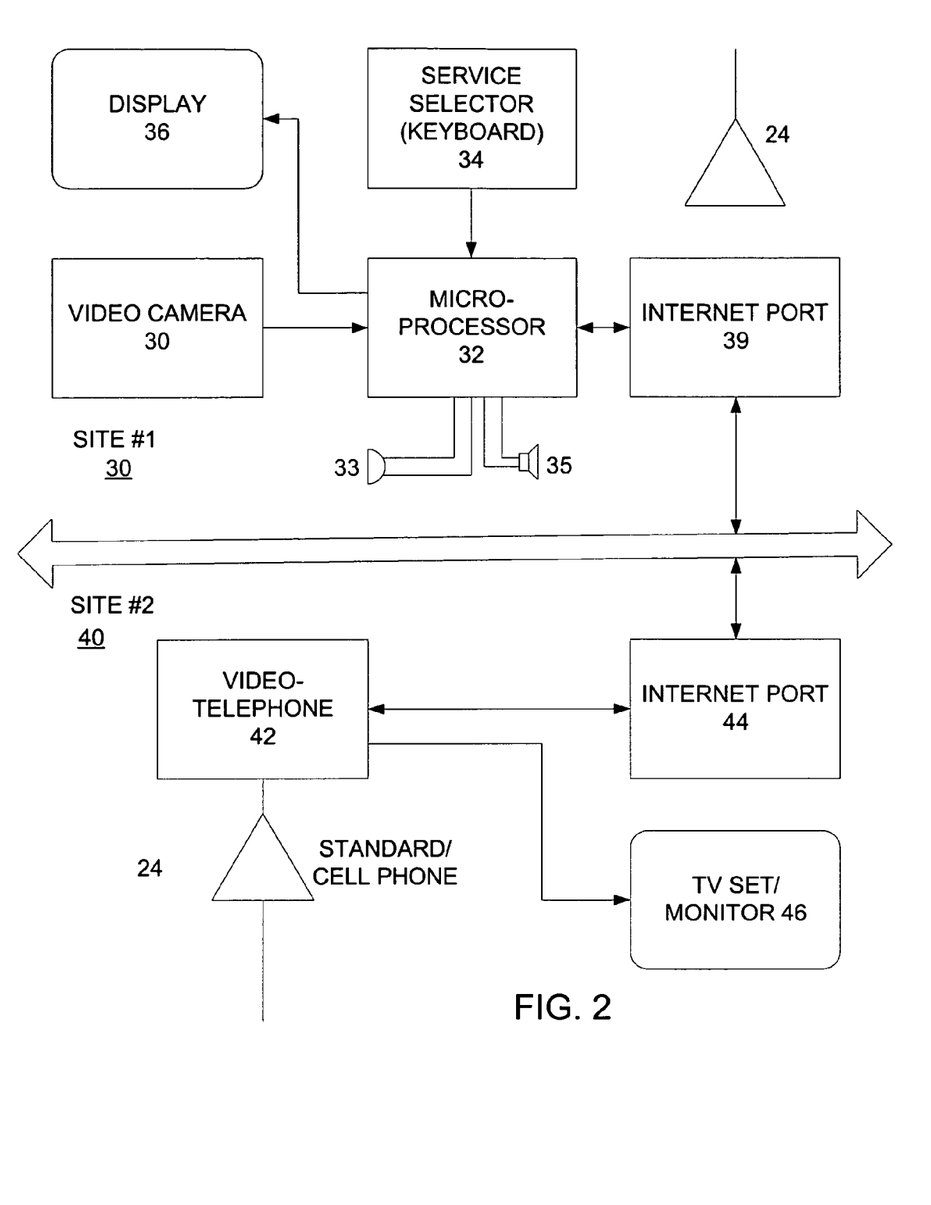
FIG. 2 shows a more detailed block diagram of the equipment provided for two users of the system of FIG. 1.

As shown in FIG. 2, at each user site equipment is provided for exchanging preferably both video and audio signals between persons at the user sites and a selected interpreter. More specifically, user site #1 is provided with a laptop or desktop computer-based apparatus. One such apparatus is described in copending application Ser. No. 10/729,590 mentioned above. The apparatus 30 includes a microprocessor 32, a service selector (for example, a standard keyboard) 34, a display 36, a video camera 38 and an internet port with a fixed or dynamic IP address 39. In addition, the apparatus 30 also includes a microphone 33 and a speaker 35. All of these elements are standard, off-the-shelf items. For example, the video camera can be a web camera available from Logitech.

The apparatus 40 at user site #2 may be used if a PC-type equipment is not available. It includes a videotelephone 42 connected to an Internet port 44 (with a fixed or dynamic IP address), and a TV set or video monitor 46. If a monitor is used, then a tuner (not shown) is needed as well. The videotelephones are available in either wired or wireless configurations from D-Link of Fountain Valley, Calif. 92708 (Models DVC 1000 or 1100). Moreover, some videotelephones are available with a built-in screen (e.g., D-Link Model DVC 2000), in which case the monitor or display 46 may be omitted. Preferably, all these elements are mounted on a rolling cart (not shown) so that they can be shifted around easily from one patient within a room to another or from one room of the hospital to another. Video-telephones may also be used in apparatus 30, thereby replacing several elements, such as the video camera 38, microphone 33 and speaker 35. However, as mentioned above, videotelephones need a tuner to display video signals on display 36.

Figure 3:
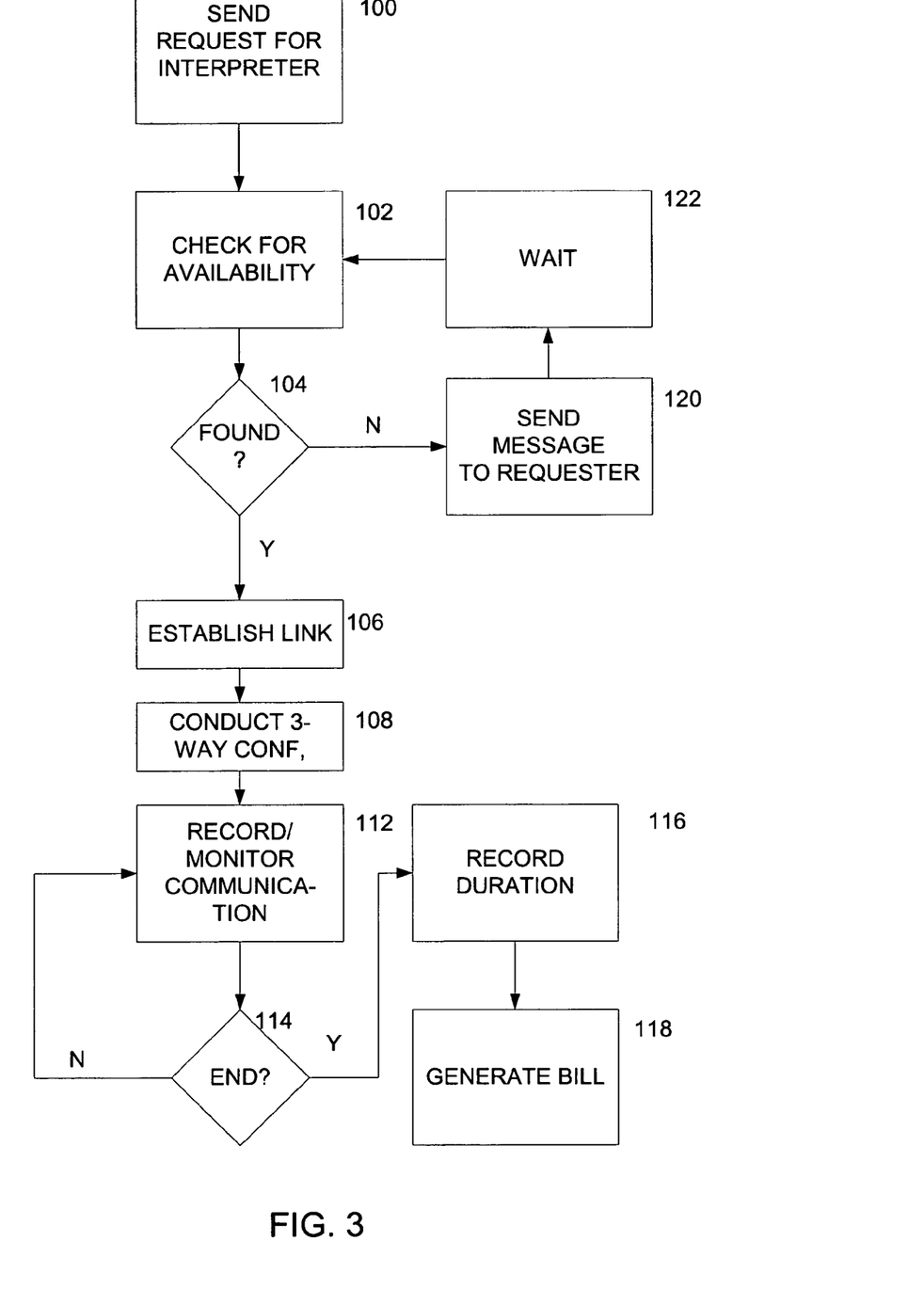
FIG. 3 shows a flow chart for the fully automated operation of the system of FIG. 1.

A typical illustrative mode of operation of the apparatus 30 at the user site #1 is now described in conjunction with the flow chart of FIG. 3. For example, a doctor or other health care provider may be visiting a patient at site #1, said patient being either mute or not understanding English. Therefore, at the start of the visit, the health care provider selects a service using the selector 34(FIG. 2) and sends a request for an interpreter in step 100. The request thus includes an identification of the patient, and/or his room and bed number, and the language in which interpretation is required (e.g., ASL).

In step 102 the central controller 10 (FIG. 1) receives the requests and, in step 104, the controller 10 starts checking (step 102) which interpreters are associated with the system, and of these interpreters, who is available. The list of interpreters and their respective field of expertise are listed in data base 12. A list of interpreters who are busy, or are out (i.e., off line) may also be stored in the data base 12. Alternatively, or in addition, the central controller 10 can also check whether any interpreters are on-line, and therefore, if they are busy providing interpreting services for other patients. Preferably, the central controller generates a listing on display 15 providing interpreter information. The list can provide information on various interpreters associated with the system. For example, the display can include a separate representation or icon for each interpreter, each icon including: information such as whether the respective interpreter is on line; whether he is active and is providing services to patients; or inactive and therefore available. The icon may also include a picture or image of the interpreter and/or other personal information, such as the sex of the interpreter, etc. (A patient may at times prefer a person of his/her own sex for discussing his/her medical condition). A similar display may be provided at each site (hospital) but not necessarily each patient.

If an appropriate interpreter is found (Step 104), then, in step 106, a link is established by controller 10 tying the port 39 to the respective interpreter site (e.g., 20 if Spanish interpretation is required), and the parties can hold a conversation (step 108). The participants are typically the patient, the doctor and the interpreter.

This whole process takes place automatically within a couple of minutes. Once a link is established between site #1 and one of the interpreters, (e.g., interpreter 20), the health care provider can enter into a discussion about the patient's illness, via the interpretation of interpreter 20. This discussion takes place in the form of a video telephone conference. Visual signals between the site #1 and a respective interpreter 20 may not be strictly necessary (except, of course, for conversations using ASL), however they are preferable because they allow the interpreter to see the gestures and other body language of the patient and provide a more accurate interpretation. Moreover, the patient feels more at ease and less apprehensive when he is communicating with a live, visible person rather then talk to a disembodied voice. This effect is further enhanced if the interpreter is from the patient's own homeland and has familiar facial expressions and mannerisms.

The conversation is being monitored (i.e., the conversation is active) by the controller 10. The length of the conversation is timed by the session timing and recording component. Optionally, the conversation may also be monitored, if this process is allowed, by the session timing/recorder element 14, step 112. At the end of the conversation (detected in step 114) the length of the conversation is recorded in step 116 and used for various purposes, including generating a bill (step 118). The information on the bill or even the bill itself is provided to the respective hospital.

Going back to step 104, if no proper interpreter is available, then, in step 120, a message is sent to the user that no interpreter is currently available and that the user should wait for a couple of minutes. The controller then waits for a predetermined duration (step 122) and then tries again in step 102. Alternatively, the controller 10 waits until it detects that another appropriate interpreter becomes available. The process could be fully automated or could be performed through a human operator at the controller 10. The operator can indicate that an appropriate interpreter will be available in x minutes. Alternatively, a request from a site can be made for an interpreter to be made available at a designated time. The request can be made either automatically or through the operator.

Rules for assigning a sequence or priority for several interpreters are stored in the data base 12 and are used to insure that the interpreters are utilized in an effective manner.

As mentioned above, preferably each site has an Internet port with a unique and known address on the Internet. Therefore, a link can be readily established between the two sites. There are several means by which the apparatus 30 can access the Internet, including, DSL, cable, WIFI, dial-up, etc.

If, for any reason, any of the participants within the process need to communicate with each other, they can call through the telephones 24.

Figure 4:
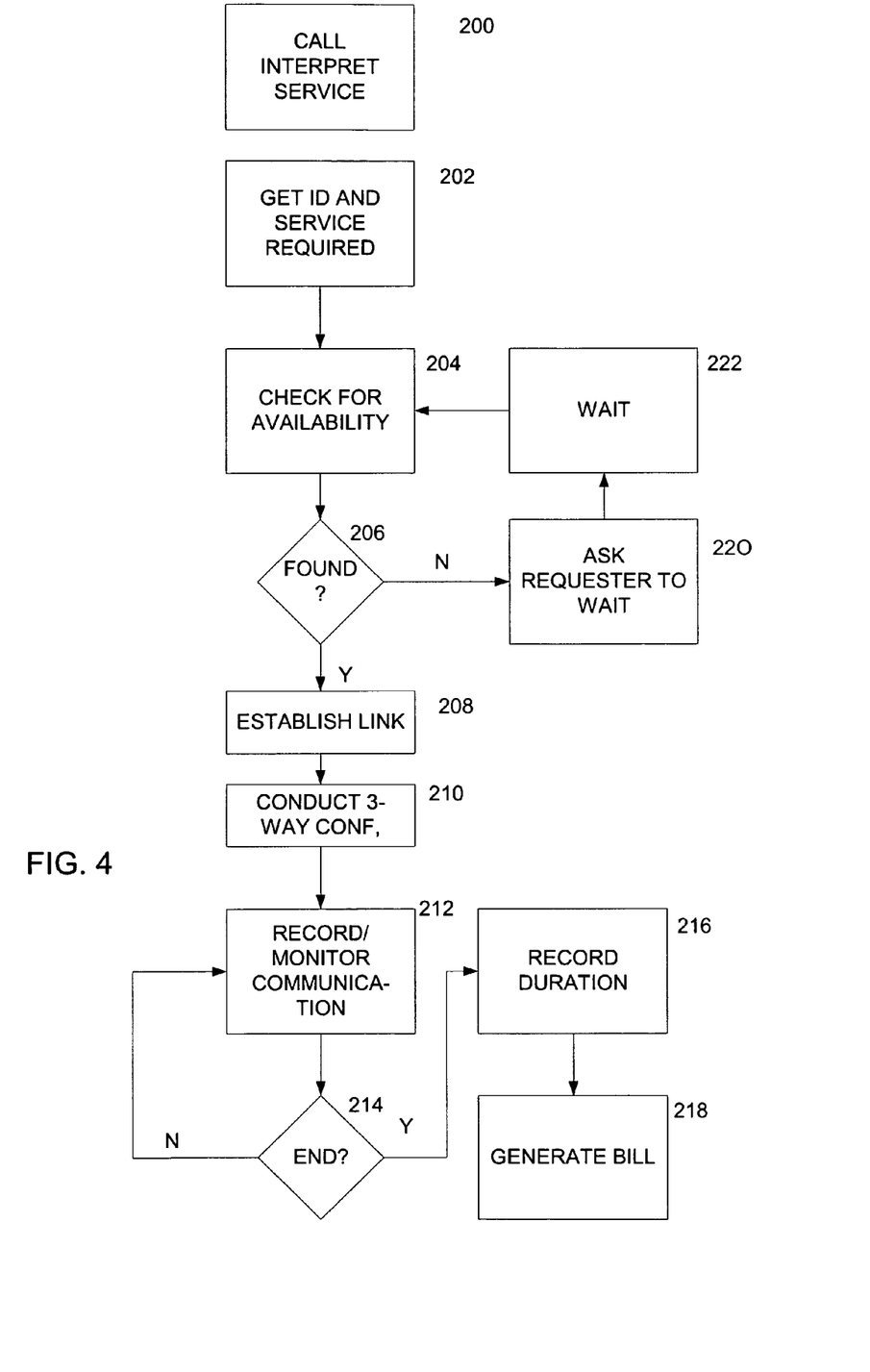
FIG. 4 shows a flow chart of a modified mode of operation of the system of FIG. 1.

The apparatus 40 can be used in a similar manner if it is provided with a means of service selection. Alternatively, the data base 12 can include information identifying what service may be required at each site. This information may be obtained from the data base of the hospital. Another mode of operation particularly suited for apparatus 40 is shown in FIG. 4. A conversation is initiated by a person (typically a health care provider) dialing a number on the telephone 24 at site #2. This number makes a connection to the telephones of central controller site (step 200). A person can respond directly, or an automated menu may be presented aurally to the caller. For example, the caller may hear the following message: "PRESS 1 IF YOU DESIRE AN ASL INTERPRETER, PRESS 2 IF YOU DESIRE A FOREIGN LANGUAGE INTERPRETER, PRESS 3 IF YOU DESIRE OTHER SERVICES." Thereafter, a person responds and obtains other information that identifies the internet port 44. For example, the caller may be asked to identify the hospital and room number, or patient's name, and the language for which interpretation is requested (step 204). This information is sufficient for the controller to provide the requested interpreter service.

Next, the called person checks to see if an interpreter is available for the requested language (step 204). If an interpreter is found (206) then the person instructs controller 10 to establish a link between the appropriate interpreter and the caller's site (step 208), and, in step 210, a three way teleconference is performed.

Steps 212-222 are similar to steps 112-122 of FIG. 3.

In this manner, the system S provides an efficient and effective method for providing interpreting services. The arrangement is particularly advantageous for relatively small hospitals or other health care providers that need interpreting services only at infrequent intervals. Alternatively, a large hospital having several buildings or campuses spread over a large area can use the system to provide rapidly in-house, experienced and trusted interpreters without having to rush them from one place to another.

Another advantage of the system is that, since the interpreters are not physically in the same location as the patients, the chance of contamination and spreading of infection by the interpreters is eliminated.

The system also provides flexibility because it can be used with a large variety of Internet connection means. These Internet connection means are standard and can be used for other functions as well. Since the protocol is standard, different connection means may be used at different sites without changing the system's modes of operation.

The system described herein may be used in other environments as well, such as court rooms and other similar sites where interpreting services are needed.

Figure 5:
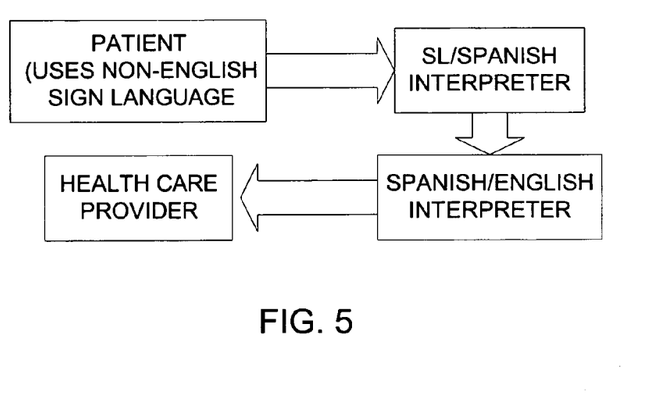
FIG. 5 shows a block diagram of a 4-way conversation in accordance with this invention.

FIG. 5 shows a 4-way conversation or communication involving a patient, a sign/foreign language interpreter, a foreign/English language interpreter and the healthcare provider. Here, the patient may only be able to communicate via sign language which may or may not be English (ASL) sign language. Where it is non-English sign language (i.e. non-ASL), then patient's communication must be interpreted first from sign language and then to the language understood by a health care provider. In an embodiment of the present invention, the participant identified as a health care provider may also be a court or any other entity with a need for the interpretation of patient's conversation. Understanding that the system according to an embodiment of the present invention, enables conversion from ASL to foreign language and also facilitates access to 180 languages over video, the system brings an ASL Interpreter together with a foreign language interpreter in this 4 way communication or conversation. This communication may take place by way of phone, video or any other communication means such as the internet. Here in FIG. 5, an exemplary language, Spanish, is illustrated. This could be any of the 180 other languages which the system has access to.

The patient may communicate by way of a non-English sign language to the sign/foreign language interpreter who then communicates to a foreign/English language interpreter and the healthcare provider. In one embodiment of the present invention, sign/foreign language interpreter may have the skills and ability to also interpret from the foreign language to English—thereby eliminating the need for the foreign/English language interpreter. In initiating and maintaining the communication shown in FIG. 5, all parties use any or all of the previously described modes, steps, etc. of communication with respect to requesting interpretation, logging on, etc.

For all foreign language interpreters illustrated here in FIG. 5, if an interpreter in a particular foreign language is busy on either a telephonic call or a video call, the system transfers an incoming call to another interpreter in that particular language. When the call is terminated the system releases that interpreter to the pool of available interpreters. Usage to the second is recorded by the software to prepare the invoice and to make available real-time usage access by the user of the service, i.e. hospital, court, etc.

The system is also able, in one embodiment of the present invention, to record the conversation even when the conversation is in sign language. This may be particularly important for depositions, courts, banks and customer service related applications.

Numerous modifications may be made to this invention without departing from its scope as defined in the appended claims.

We claim:

1. A system for providing interpreting services comprising:
    a user site where interpreting services are needed, each site having an interpreting apparatus including user teleconferencing means and an internet port with a fixed IP address coupled to said teleconferencing means;
    an interpreter site with internet access means and interpreter teleconferencing means;
    a database of interpreters associated with said system; and
    a central controller for receiving interpreting service requests from said user site wherein said central controller is adapted to search said database for appropriate interpreters, determine the availability of an interpreter after waiting for a predetermined duration following an unsuccessful search for an interpreter and establish a teleconference conversation link between said user site and an appropriate interpreter as uncovered by said central controller's search of said database.

2. The system of claim 1 wherein said user site includes a selector for selecting an interpreting service for interpreting at least one of ASL and a foreign language.

3. The system of claim 1 wherein said user and said interpreter teleconferencing means are adapted to provide voice teleconferencing.

4. The system of claim 1 wherein said user and said interpreter teleconferencing means are adapted to provide voice and video teleconferencing.

5. A system for providing interpreting services comprising:
    a plurality of health care facility sites, each site including an interpreting apparatus including user conferencing means and a user internet access port with a unique IP address;
    a plurality of interpreter sites, each site including interpreter conferencing means and internet access means coupled to said interpreter conferencing means, each interpreter sites being operated by an interpreter specializing in a specific language;
    a database of interpreters associated with said system; and
    a central controller for receiving a request for interpreting services from a site for a specific language, wherein said central controller is adapted to search said database for appropriate interpreters, select a specific interpreter based on said request, determine the availability of an interpreter after waiting for a predetermined duration following an unsuccessful database search for an interpreter and establish a teleconference conversation link between said user site and an appropriate interpreter as uncovered by said central controller's search of said database.

6. The system of claim 5 wherein said interpreting apparatus includes a selector for selecting said language and means for generating said request coupled to said selector.

7. The system of claim 5 wherein said central controller includes a monitor for monitoring at least the duration of a conference on said link.

8. The system of claim 7 wherein said monitor records said conference.

9. The system of claim 5 wherein said interpreting apparatus includes a videoconferencing device.

10. The system of claim 5 wherein said interpreting apparatus includes a microprocessor, a TV display, a microphone and a speaker for performing conferencing.

11. A method of providing interpreter services comprising:
    providing interpreter apparatus at a plurality of user sites;
    assigning a specific IP address to each user site;
    sending a request for interpreting in a specific language to a central controller from a first user;
    searching a database of interpreters;
    generating an Internet link by said controller between said first user and an interpreting site;

determining which interpreters are associated with said interpreter services;

determining the availability of an interpreter at said interpreting site after waiting for a predetermined duration following an unsuccessful search for said interpreter at said interpreter site; and providing live interpreting to said first user site from said interpreting site through said internet link.

12. The method of claim 11 further comprising calling said central controller from said first user to provide said request.

13. The method of claim 11 further comprising generating said request from said first user site to said central controller without human intervention.

14. The method of claim 11 further comprising providing a plurality of interpreting sites from which interpreting can be performed in different languages.

15. The method of claim 14 wherein at least two interpreting sites provide interpreting services in the same language.

16. The method of claim 15 further comprising monitoring said interpreting sites by said central controller to determine when one of said sites is available to respond to said request.

17. The method of claim 16 further comprising deciding which of two or more interpreting sites is connected to said first user site in accordance with a predetermined criteria.

18. The method of claim 14 wherein at least one interpreting site provides interpreting services in ASL.

* * * * *